US009039924B2

(12) United States Patent
Leavitt et al.

(10) Patent No.: US 9,039,924 B2
(45) Date of Patent: May 26, 2015

(54) COOLING AGENT FOR COLD PACKS AND FOOD AND BEVERAGE CONTAINERS

(75) Inventors: David D. Leavitt, Edmond, OK (US); John R. Bergida, Front Royal, VA (US)

(73) Assignee: Frosty Cold, LLC, Front Royal, VA (US)

( * ) Notice: Subject to any disclaimer, the term of this patent is extended or adjusted under 35 U.S.C. 154(b) by 131 days.

(21) Appl. No.: 13/310,424

(22) Filed: Dec. 2, 2011

(65) Prior Publication Data

US 2012/0138848 A1    Jun. 7, 2012

Related U.S. Application Data

(60) Provisional application No. 61/419,097, filed on Dec. 2, 2010.

(51) Int. Cl.
C09K 5/06 (2006.01)
(52) U.S. Cl.
CPC .................................... C09K 5/066 (2013.01)
(58) Field of Classification Search
CPC ................................ C09K 5/06; C09K 5/066
See application file for complete search history.

(56) References Cited

U.S. PATENT DOCUMENTS

| | | |
|---|---|---|
| 1,313,290 A | 8/1919 | Grant |
| 1,894,775 A | 1/1933 | Levenson |
| 1,897,723 A | 2/1933 | Free |
| 2,460,765 A | 2/1949 | Palaith |
| 2,515,840 A | 7/1950 | Rodeck |
| 2,556,893 A | 6/1951 | Zwiebach et al. |
| 2,622,415 A | 12/1952 | Landers et al. |
| 2,657,977 A | 11/1953 | Stengel et al. |
| 2,746,265 A | 5/1956 | Mills |
| 2,757,517 A | 8/1956 | Goldberg |
| 2,800,454 A | 7/1957 | Shepherd |
| 2,805,556 A | 9/1957 | Wang |
| 2,882,691 A | 4/1959 | Robbins |
| 2,900,808 A | 8/1959 | Wang |
| 2,916,866 A | 12/1959 | Brinkman |
| 2,929,220 A | 3/1960 | Schlumbohm |
| 2,968,932 A | 1/1961 | Vance et al. |
| 3,003,324 A | 10/1961 | Vance et al. |
| 3,023,587 A | 3/1962 | Robbins |
| 3,034,305 A | 5/1962 | Ruggieri |
| 3,058,313 A | 10/1962 | Robbins |
| 3,095,291 A | 6/1963 | Robbins |
| 3,134,577 A | 5/1964 | Bollmeier |
| 3,191,392 A | 6/1965 | Donnelly |
| 3,213,932 A | 10/1965 | Gottfurcht et al. |
| 3,229,478 A | 1/1966 | Alonso |
| 3,269,141 A | 8/1966 | Weiss |
| 3,309,890 A | 3/1967 | Barnett et al. |
| 3,326,013 A | 6/1967 | Jacobs |
| 3,338,067 A | 8/1967 | Warner |
| 3,366,468 A | 1/1968 | Porter |
| 3,369,369 A | 2/1968 | Weiss |
| 3,373,581 A | 3/1968 | Strader |
| 3,379,025 A | 4/1968 | Donnelly |
| 3,494,142 A | 2/1970 | Beck |
| 3,494,143 A | 2/1970 | Barnett et al. |
| 3,520,148 A | 7/1970 | Fuerle |
| 3,525,236 A | 8/1970 | Solhkhah |
| 3,559,416 A | 2/1971 | Cornwall |
| 3,597,937 A | 8/1971 | Parks |
| 3,620,406 A | 11/1971 | Evans |
| 3,636,726 A | 1/1972 | Rosenfeld et al. |
| 3,726,106 A | 4/1973 | Jaeger |
| 3,759,060 A | 9/1973 | Chase |
| 3,763,622 A | 10/1973 | Stanley, Jr. |
| 3,803,867 A | 4/1974 | Willis |
| 3,842,617 A | 10/1974 | Chase et al. |
| 3,852,975 A | 12/1974 | Beck |
| 3,881,321 A | 5/1975 | Riley |
| 3,889,483 A | 6/1975 | Donnelly |
| 3,919,856 A | 11/1975 | Beck |
| 3,950,158 A | 4/1976 | Gossett |
| 3,957,472 A | 5/1976 | Donnelly |
| 3,970,068 A | 7/1976 | Sato |
| 3,977,202 A | 8/1976 | Forusz et al. |
| 3,987,643 A | 10/1976 | Willis |
| 4,000,996 A | 1/1977 | Jordan |
| 4,010,620 A | 3/1977 | Telkes |
| 4,049,408 A | 9/1977 | Patel |
| 4,081,256 A | 3/1978 | Donnelly |
| 4,403,868 A | 9/1983 | Kupka |
| 4,462,224 A | 7/1984 | Dunshee et al. |
| 4,640,101 A | 2/1987 | Johnson |
| 4,640,264 A | 2/1987 | Yamaguchi et al. |
| 4,655,951 A | 4/1987 | Hanazaki et al. |
| 4,668,259 A | 5/1987 | Gupta |
| 4,679,407 A | 7/1987 | Kim et al. |
| 4,688,395 A | 8/1987 | Holcomb |
| 4,722,323 A | 2/1988 | Oblon |
| 4,784,678 A | 11/1988 | Rudick et al. |
| 4,816,048 A | 3/1989 | Kimmelshue |
| 4,911,740 A | 3/1990 | Schieder |
| 4,925,470 A | 5/1990 | Chou |
| 4,993,237 A | 2/1991 | Bond et al. |
| 5,184,470 A | 2/1993 | Moser et al. |
| 5,197,302 A | 3/1993 | Sabin et al. |
| 5,255,812 A | 10/1993 | Hsu |
| 5,257,755 A | 11/1993 | Moser et al. |
| 5,261,241 A | 11/1993 | Kitahara et al. |
| 5,394,703 A | 3/1995 | Anthony |
| 5,429,762 A | 7/1995 | Kitahara et al. |
| 5,431,022 A | 7/1995 | Abe |
| 5,461,867 A | 10/1995 | Scudder et al. |
| 5,626,022 A | 5/1997 | Scudder et al. |

(Continued)

Primary Examiner — John Hardee

(74) Attorney, Agent, or Firm — Lathrop & Gage LLP

(57) ABSTRACT

Safe, stable, non-toxic and recyclable cooling compositions comprising solid particulate compounds that undergo an endothermic process when mixed with water such that the resulting mixture is useful for cooling surfaces, liquids and solids. The compositions always include one or more compounds from a group consisting of endothermic compounds that contain potassium; one or more compounds from a group of endothermic compounds that contain nitrogen; and at least one compound from a group consisting of ammonium phosphate, diammonium phosphate, ammonium polyphosphate, ammonium pyrophosphate and ammonium metaphosphate such that the compound or mixture of compounds in this group is at least 1% by weight of the final composition.

5 Claims, No Drawings

(56) References Cited

U.S. PATENT DOCUMENTS

| | | | |
|---|---|---|---|
| 5,655,384 A | 8/1997 | Joslin, Jr. | |
| 5,809,786 A | 9/1998 | Scudder et al. | |
| 5,941,078 A | 8/1999 | Scudder et al. | |
| 5,979,164 A | 11/1999 | Scudder et al. | |
| 5,992,677 A | 11/1999 | Ebine | |
| 6,103,280 A | 8/2000 | Molzahn et al. | |
| 6,128,906 A | 10/2000 | Sillince | |
| 6,141,970 A | 11/2000 | Molzahn et al. | |
| 6,178,753 B1 | 1/2001 | Scudder et al. | |
| 6,266,879 B1 | 7/2001 | Scudder et al. | |
| 6,351,953 B1 | 3/2002 | Scudder et al. | |
| 6,722,153 B2 | 4/2004 | Jeuch | |
| 6,739,731 B2 | 5/2004 | Katzman | |
| 6,789,391 B2 | 9/2004 | Graham et al. | |
| 6,827,080 B2 | 12/2004 | Fish et al. | |
| 6,854,280 B2 | 2/2005 | Jeuch | |
| 6,962,149 B2 | 11/2005 | Kolb | |
| 6,986,345 B2 | 1/2006 | Kolb | |
| 7,004,161 B2 | 2/2006 | Kolb | |
| 7,025,055 B2 | 4/2006 | Scudder et al. | |
| 7,117,684 B2 | 10/2006 | Scudder et al. | |
| 7,240,507 B2 | 7/2007 | Jeuch | |
| 7,350,361 B2 | 4/2008 | Maxwell et al. | |
| 7,350,362 B2 | 4/2008 | Danwoody | |
| 7,390,341 B2 | 6/2008 | Jeuch | |
| 7,681,726 B2 | 3/2010 | O'Donnell et al. | |

COOLING AGENT FOR COLD PACKS AND FOOD AND BEVERAGE CONTAINERS

RELATED APPLICATION

This application claim priority to U.S. Patent Application 61/419,097, filed Dec. 2, 2010, the disclosure of which is incorporated herein by reference.

BACKGROUND OF THE INVENTION

1. Field of the Invention

This invention relates generally to cooling agents or compositions that can be used to cool surfaces, liquids and solids when activated upon mixing with water and more particularly to cooling agents that are effective, resistant to combustion, insensitive to detonation, non-toxic and recyclable as a balanced NPK fertilizer.

2. Description of the Art

The present invention relates to compositions which produce an endothermic reaction when mixed with water, and which are non-toxic, non-explosive and can be recycled as a balanced NPK fertilizer when no longer useful as a cooling agent. Although not so limited, the invention has particular utility when used as a cooling agent in therapeutic cold packs for the treatment of sprains and injuries; for chilling of beverages and packaged foods; and for other applications where it is desirable to cool surfaces, fluids or objects.

Compositions producing an endothermic effect and devices or containers that utilize such compositions are known in the prior art. Such compositions typically produce their endothermic effect by either chemical reaction or by heat absorbing processes. Examples of endothermic chemical reactions include: the reaction of barium hydroxide octahydrate crystals with dry ammonium chloride with the subsequent evolution of ammonia; the reaction of thionyl chloride with cobalt(II) sulfate heptahydrate; and the reaction of ethanoic acid with sodium carbonate. Examples of such endothermic processes include: melting ice cubes, melting solid salts, evaporating liquid water, making an anhydrous salt from a hydrate and the dissolution of salts in water.

As a general rule, compositions that undergo endothermic reactions are useful for cooling but often utilize toxic reactants such as cobalt and barium hydroxide or produce noxious and irritating byproducts such as ammonia, or gasses that are difficult to contain and process such as carbon dioxide. Heat-absorbing processes are thus more commonly used to cool substances compared to chemical reactions. With respect to cold packs and beverage coolers, heat-absorbing processes based upon the dissolution of various salts in water are commonly described. Here the selection of a particular material has primarily been based upon the magnitude of its positive enthalpy of solution (heat of solution) and its solubility in water or another solvent whereby the most effective compositions have the highest positive heat of solution and highest solubility.

With respect to the above, U.S. Pat. No. 1,894,775 disclosed the use of various sodium, potassium and ammonium salt solutions, including sodium acetate, ammonium nitrate and sodium thiosulfate mixed with water, to provide therapeutic cooling in 1933. Subsequently many other patents have disclosed the use of additional compounds along with various wetting and gelling agents and co-solvents other than water to improve the cooling performance of endothermic compositions when applied to cold packs and beverages. As an example, U.S. Pat. No. 3,957,472 describes a chemical heat transfer unit that uses compounds selected from a group that includes ammonium sulfamate, potassium nitrate, ammonium bisulfate, ammonium bromide, ammonium bicarbonate, ammonium iodide, ammonium magnesium selenate, ammonium maganese sulfate, ammonium phosphate dibasic, ammonium potassium tartrate, ammonium salicylate, ammonium sulfate, ammonium sodium sulfate, ammonium thiocyonate, ammonium persulfate, potassium phosphate, potassium sulfate, potassium sodium tartrate, potassium thiocyanate, potassium iodide, potassium chloride, urea, afenil, sodium acetate, sodium citrate, sodium nitrate, sodium thiocyanate, sodium thiosulfate, citric acid, tartaric acid, ferric ammonium sulfate and thiourea. In another example, U.S. Pat. No. 4,081,256 describes an endothermic composition and cold pack whereby urea, hydrated sodium acetate, potassium chloride, potassium nitrate, ammonium chloride, and guar gum are blended together to extend the cooling life of the cold pack. In still other examples, U.S. Pat. No. 4,010,620 utilizes ammonium chloride and ammonium nitrate for maximum cooling effect; U.S. Pat. No. 6,233,945 describes an extended life cold pack that uses ammonium nitrate, ammonium sulfamate, ammonium nitrite, ammonium iodide, ammonium bromide, sodium chloride, sodium nitrate, sodium nitrite, sodium carbonate, sodium bicarbonate, potassium nitrate, potassium nitrite, urea, methylurea, and combinations thereof; U.S. Pat. No. 5,429,762 discloses a cooling agent consisting of one or more of a group comprised of disodium hydrogen phosphate, sodium dihydrogen phosphate, trisodium phosphate, sodium ammonium hydrogen phosphate, diammonium hydrogen phosphate, and hydrates thereof; and U.S. Pat. No. 4,010,620 describes a cooling system that utilizes sodium nitrate, ammonium nitrate, ammonium thiocyanate, potassium thiocyanate, and ammonium nitrate individually or in combination.

A review of the prior art reveals that, although a wide variety of chemical compositions have been disclosed, only a select few are preferred based upon performance as a cooling agent. This is best illustrated by a review of the selected endothermic compounds shown in Table 1.

TABLE 1

SELECTED ENDOTHERMIC COMPOUNDS USEFUL FOR COOLING SURFACES, SOLIDS AND LIQUIDS

| Solute | MW (gm/mol) | $LD_{50}$ (oral-rat; mg/kg) | Heat of Solution (kJ/mol) | Solubility (gm solute per 100 gm water at 20° C.) | Heat Absorbed (during dissolution of compound in 100 gm of water at 25° C. in kJ) | Theoretical Change in Temperature of a saturated solution (° C.) | Predicted Change in Temperature of a saturated solution exhibiting 30% heat loss (° C.) | Predicted Final Temperature of 255 gm of liquid exposed to saturated solution exhibiting 50% heat loss (° C.) |
|---|---|---|---|---|---|---|---|---|
| $C_{12}H_{22}O_{11}$ | 342.3 | 29700 | 5.4 | 201.9 | 3.19 | 3 | 2 | 24 |
| $C_6H_{12}O_6$ | 180.16 | 25800 | 11 | 49 | 2.99 | 5 | 3 | 24 |
| $C_6H_{12}O_6 \cdot H_2O$ | 198.16 | 25800 | 19 | 49 | 4.70 | 8 | 5 | 23 |
| $CO(NH_2)_2$ | 60.07 | 8471 | 15 | 108 | 26.97 | 31 | 22 | 16 |

TABLE 1-continued

SELECTED ENDOTHERMIC COMPOUNDS USEFUL FOR COOLING SURFACES, SOLIDS AND LIQUIDS

| Solute | MW (gm/mol) | $LD_{50}$ (oral-rat; mg/kg) | Heat of Solution (kJ/mol) | Solubility (gm solute per 100 gm water at 20° C.) | Heat Absorbed (during dissolution of compound in 100 gm of water at 25° C. in kJ) | Theoretical Change in Temperature of a saturated solution (° C.) | Predicted Change in Temperature of a saturated solution exhibiting 30% heat loss (° C.) | Predicted Final Temperature of 255 gm of liquid exposed to saturated solution exhibiting 50% heat loss (° C.) |
|---|---|---|---|---|---|---|---|---|
| $KF \cdot 2(H_2O)$ | 94.13 | 245 | 6.97 | 349 | 25.84 | 14 | 10 | 17 |
| KCl | 74.55 | 2600 | 17.22 | 34.2 | 7.90 | 14 | 10 | 22 |
| $KClO_3$ | 122.55 | 1870 | 41.38 | 7.3 | 2.46 | 5 | 4 | 24 |
| $KClO_4$ | 138.54 | 100 | 51.04 | 1.5 | 0.55 | 1 | 1 | 25 |
| KBr | 119 | 3070 | 19.87 | 65.3 | 10.90 | 16 | 11 | 21 |
| $KBrO_3$ | 106 | 321 | 41.13 | 6.91 | 2.68 | 6 | 4 | 24 |
| KI | 166 | 1862 | 20.33 | 140 | 17.15 | 17 | 12 | 19 |
| $KIO_3$ | 214 | 136 | 27.74 | 4.74 | 0.61 | 1 | 1 | 25 |
| $KNO_2$ | 85.11 | 250 | 13.35 | 306 | 48.00 | 28 | 20 | 17 |
| $KNO_3$ | 101.1 | 3750 | 34.89 | 31.6 | 10.91 | 20 | 14 | 21 |
| $K_2S_2O_3 \cdot 5H_2O$ | 360.32 | 802 | 47 | 205 | 26.74 | 21 | 15 | 16 |
| KCN | 65.12 | 5 | 11.72 | 71.6 | 12.89 | 18 | 13 | 21 |
| KCNO | 81.12 | 841 | 20.25 | 75 | 18.72 | 26 | 18 | 19 |
| KCNS | 97.18 | 854 | 24.23 | 224 | 55.85 | 41 | 29 | 7 |
| $KMnO_4$ | 158.04 | 1090 | 43.56 | 6.3 | 1.74 | 4 | 3 | 24 |
| $K_2SO_4$ | 174.25 | 6600 | 23.8 | 11.1 | 1.52 | 3 | 2 | 25 |
| NaF | 41.99 | 52 | 0.91 | 4.13 | 0.09 | 0 | 0 | 25 |
| NaCl | 58.44 | 3000 | 3.88 | 359 | 23.84 | 12 | 9 | 17 |
| $NaClO_2$ | 90.44 | 165 | 0.33 | 39 | 0.14 | 0 | 0 | 25 |
| $NaClO_2 \cdot 3H_2O$ | 144.44 | 165 | 28.58 | 39 | 7.72 | 13 | 9 | 22 |
| $NaClO_3$ | 106.44 | 1200 | 21.72 | 101 | 20.61 | 25 | 17 | 18 |
| $NaClO_4$ | 122.44 | 2100 | 13.88 | 201 | 22.79 | 18 | 13 | 18 |
| $NaClO_2 \cdot H_2O$ | 140.44 | 2100 | 22.51 | 201 | 32.22 | 26 | 18 | 14 |
| $NaBr \cdot 2H_2O$ | 138.89 | 3500 | 18.64 | 90.5 | 12.15 | 15 | 11 | 21 |
| $NaBrO_3$ | 150.89 | 301 | 26.9 | 37.4 | 6.67 | 12 | 8 | 23 |
| $NaI \cdot 2H_2O$ | 185.89 | 4340 | 16.13 | 184 | 15.97 | 13 | 9 | 20 |
| $NaIO_3$ | 197.89 | 180 | 20.29 | 9.47 | 0.97 | 2 | 1 | 25 |
| $NaNO_2$ | 68 | 180 | 13.89 | 80.8 | 16.50 | 22 | 15 | 20 |
| $NaNO_3$ | 84.99 | 3236 | 20.5 | 87.6 | 21.13 | 27 | 19 | 18 |
| $NaC_2H_3O_2 \cdot 3H_2O$ | 136.08 | 3530 | 19.66 | 85 | 12.28 | 16 | 11 | 21 |
| $Na_2S_2O_3 \cdot 5H_2O$ | 248.17 | 2300 | 47.4 | 79 | 15.09 | 20 | 14 | 20 |
| NaCN | 49 | 6 | 1.21 | 58 | 1.43 | 2 | 2 | 25 |
| $NaCN \cdot 2H_2O$ | 85 | 6 | 18.58 | 82 | 17.92 | 24 | 16 | 19 |
| NaCNO | 65.01 | 5 | 19.2 | 110 | 32.49 | 37 | 26 | 14 |
| NaCNS | 81.05 | 764 | 6.83 | 139 | 11.71 | 12 | 8 | 21 |
| $Na_3PO_4$ | 163.94 | 7400 | 15.9 | 8.8 | 0.85 | 2 | 1 | 25 |
| $NaHCO_3$ | 83.99 | 4220 | 16.7 | 7.8 | 1.55 | 3 | 2 | 24 |
| $NH_4Cl$ | 53.49 | 1650 | 14.78 | 29.7 | 8.21 | 15 | 11 | 22 |
| $NH_4ClO_4$ | 117.49 | 100 | 33.47 | 20.8 | 5.93 | 12 | 8 | 23 |
| $NH_4Br$ | 97.94 | 2700 | 16.78 | 78.3 | 13.42 | 18 | 13 | 21 |
| $NH_4I$ | 144.94 | 76 | 13.72 | 172 | 16.28 | 14 | 10 | 20 |
| $NH_4IO_3$ | 192.94 | 500 | 31.8 | 182 | 30.00 | 25 | 18 | 15 |
| $NH_4NO_2$ | 64.04 | 57 | 19.25 | 150 | 45.09 | 43 | 30 | 10 |
| $NH_4NO_3$ | 80.06 | 2217 | 25.69 | 150 | 48.13 | 46 | 32 | 9 |
| $NH_4CN$ | 44.06 | 525 | 17.57 | 60 | 23.93 | 36 | 25 | 17 |
| $NH_4CNS$ | 76.12 | 954 | 22.58 | 144 | 42.72 | 42 | 29 | 11 |
| $(NH_4)_3PO_4$ | 149 | 3000 | 14.45 | 37.7 | 3.66 | 6 | 4 | 24 |
| $CH_3NH_3Cl$ | 67.52 | 1600 | 5.77 | 30.6 | 2.61 | 5 | 3 | 24 |
| $AgClO_4$ | 207.32 | Toxic | 7.38 | 557 | 19.83 | 7 | 5 | 18 |
| $AgNO_2$ | 153.87 | Toxic | 36.94 | 4.2 | 1.01 | 2 | 2 | 25 |
| $AgNO_3$ | 169.87 | Toxic | 22.59 | 257 | 34.18 | 23 | 16 | 14 |
| $RbClO_4$ | 184.92 | 3310 | 56.74 | 1.3 | 0.40 | 1 | 1 | 25 |
| $RbNO_3$ | 147.47 | 4625 | 36.48 | 44.28 | 10.95 | 18 | 13 | 21 |
| $CsClO_4$ | 232.36 | 3310 | 55.44 | 1.97 | 0.47 | 1 | 1 | 25 |
| $CsNO_3$ | 194.91 | 1200 | 40 | 9.16 | 1.88 | 4 | 3 | 24 |
| $BaCl_2 \cdot 2H_2O$ | 244.27 | 118 | 20.58 | 31 | 2.61 | 5 | 3 | 24 |
| $MgSO4 \cdot 7H2O$ | 246.36 | 2840 | 16.11 | 255 | 16.67 | 11 | 8 | 20 |

In Table 1, the selected endothermic compounds (solutes) are classified with respect to their toxicity, heat of solution and solubility in water. Toxicity is measured by the oral rat $LD_{50}$ value for a compound taken from various toxicological databases or from the Material Safety Data Sheet (MSDS) for the compound or from other indicators of toxicity if $LD_{50}$ data isn't available. Compounds with an $LD_{50}$ above 1000 are preferred for applications where there is a potential for human and environmental exposure. Heat of solution values are taken from CRC Handbook of Chemistry and Physics, 90th Ed. Solubility values are taken from the Solubility Database shown on the International Union of Pure and Applied Chemistry/National Institute of Standards and Technology website.

An endothermic process absorbs heat from the environment during the dissolution of the compound in water. The theoretical heat absorbed during the dissolution of compound in 100 gm of water at 25° C. in kJ can be calculated from the following equations using the data in the table:

$$[H_{Sol}]*[\text{moles of solute}] = [\text{mass of solution}]*C_p*[T_1-T_2] \quad 1.$$

where $H_{Sol}$ is in kJ/Mol
mass of solution refers to the mass of a saturated solution in 100 gm of water
$C_p$ is assumed to be 4.184 J/g °C.
$T_1$ is 20° C.
$T_2$ is the final temperature of the saturated solution $$\Delta q = \text{heat absorbed} = [\text{mass of solution}]*4.184*[T_1-T_2] \qquad 2.$$

The theoretical heat absorbed and the final theoretical temperature of the saturated endothermic solutions are shown in the table.

This data was then used to predict the cooling effect of saturated solutions of the various endothermic compounds upon a typical beverage container having a volume of around 12 ounces. For a reference, approximately 60 grams of 200 mesh ammonium nitrate was thoroughly mixed with approximately 50 grams of water in an un-insulated 100 ml sealed container which was then placed in a larger sealed un-insulated container having a volume of around 360 ml that contained around 255 ml of water. The larger sealed container had approximately the same dimensions and surface area as a typical 12 ounce beverage can. After around 30 seconds, the temperature of the saturated solution in the 100 ml container attained −7° C. from an initial temperature of 25° C. and after around 3 minutes the temperature of the water in the 360 ml container attained around 9° C. from an initial temperature of 25° C. This reference test indicated that the theoretical change in temperature of a saturated solution of ammonium nitrate was approximately 30% more than the measured change in temperature due to heat losses from the 100 ml container while the container was being mixed prior to placing it in the 360 ml container that contained the water. A similar calculation showed that heat losses from the un-insulated 360 ml container was around 50%. The heat loss factors were then used to determine the predicted temperature changes shown in the table for the various saturated salt solutions and for a 360 ml container filled with 255 ml of liquid exposed to the various saturated salt solutions. The predicted results were then used to rate the performance of the selected endothermic compounds in terms of their performance as a cooling agent.

The compounds predicted in the table to be most useful as cooling agents should show at least a 10° C. reduction in temperature when dissolved in water and include urea (CO(NH$_2$)$_2$), potassium fluoride dihydrate (KF.2(H$_2$O), potassium chloride (KCl), potassium bromide (KBr), potassium iodide (KI), potassium nitrite (KNO$_2$), potassium nitrate (KNO$_3$), potassium thiosulfate pentahydrate (K$_2$S$_2$O$_3$.5H$_2$O), potassium cyanide (KCN), potassium cyanate (KCNO), potassium thiocyanide (KCNS), sodium perchlorite (NaClO$_3$), sodium perchlorate (NaClO$_3$), sodium perchlorite dihydrate (NaClO$_2$.H$_2$O), sodium bromide dihydrate (NaBr.2H$_2$O), sodium nitrite (NaNO$_2$), sodium nitrate (NaNO$_3$), sodium acetate trihydrate (NaC$_2$H$_3$O$_2$.3H$_2$O), sodium thiosulfate pentahydrate (Na$_2$S$_2$O$_3$.5H$_2$O), sodium cyanide dihydrate (NaCN.2H$_2$O), sodium cyanate (NaCNO), ammonium chloride (NH$_4$Cl), ammonium bromide (NH$_4$Br), ammonium iodide (NH$_4$I), ammonium iodate (NH$_4$IO$_3$), ammonium nitrite (NH$_4$NO$_2$), ammonium nitrate (NH$_4$NO$_3$), ammonium cyanide (NH$_4$CN), ammonium thiocyanide (NH$_4$CNS), silver nitrate (AgNO$_3$) and rubidium nitrate (RbNO$_3$).

Of this group, potassium fluoride dehydrate, potassium nitrite, potassium thiosulfate pentahydrate, potassium cyanide, potassium cyanate, potassium thiocyanide, sodium nitrite, sodium cyanide dihydrate, sodium cyanate, ammonium iodide, ammonium iodate, ammonium nitrite, ammonium cyanide, ammonium thiocyanide, and silver nitrate have LD$_{50}$ values below 1000 or are toxic and are less than desirable for use in a consumer-oriented product such as a cold pack or beverage coolant. Potassium nitrite, potassium nitrate, sodium perchlorite, sodium perchlorate, sodium perchlorite dihydrate, sodium nitrite, sodium nitrate, ammonium nitrite and ammonium nitrate are all strong oxidizing agents and thus are reactive and have a tendency to promote combustion or are unstable during storage. Urea is also described as being unstable when mixed or blended with a wide variety of other endothermic compounds including ammonium nitrate, and blends of urea and other compounds that are described in the prior art as having synergistic coolant properties are rendered ineffective by a reduced shelf-life. Potassium nitrite, potassium nitrate, sodium nitrate, ammonium nitrite and ammonium nitrate are also capable of detonation and explosion, with ammonium nitrate having a particularly bad reputation as the explosive of choice for weapons of terror even though it is one of the most effective cooling agents disclosed in Table 1 and in the prior art. Mixtures of ammonium nitrate and urea are also commonly formulated together to make powerful commercial explosives.

Chemical cooling agents also suffer from the stigma of being a wasteful product that is not easily reused or recycled. Many of the endothermic compounds and compositions shown in Table 1 or disclosed in the prior art are classified as hazardous substances or are harmful to the environment if disposed in an improper or imprudent manner after they no longer have utility as a cooling agent.

For all of the above reasons, cooling agents and compositions described in the prior art have had limited commercial success with the possible exception of cold pack applications. The most effective commercialized cold pack applications, however, utilize ammonium nitrate or mixtures of ammonium nitrate and urea and are susceptible to increased regulation and subject to restrictions on use, and may not be available for use in consumer products in the future.

SUMMARY OF THE INVENTION

It is a principal object of this invention to provide safe, non-toxic and recyclable cooling compositions comprising solid particulate compounds that undergo an effective endothermic process when mixed with water such that the resulting mixture is useful for cooling surfaces, liquids and solids. Because ammonium nitrate and urea are already in commercial use for cold pack applications but are in danger of being rendered unmarketable because of concerns about safety and explosivity, it is also an object of the invention to provide safe and non-explosive endothermic compositions that contain these compounds and the other strongly oxidizing cooling agents described herein. It is also an object of this invention to provide endothermic compositions that can be recycled for a beneficial use as balanced NPK fertilizer when they are no longer useful as cooling agents.

Although not prescribed for various cooling agents, methods for improving the safety of ammonium nitrate for use as a fertilizer are described in the prior art. For example, U.S. Pat. No. 3,366,468 disclosed a method for manufacturing desensitized ammonium nitrate having lowered flammability and reduced sensitivity to explosive detonation. Here various ammonium phosphate compounds are incorporated together with ammonium nitrate during process of manufacturing ammonium nitrate fertilizer. The resultant ammonium nitrate fertilizer containing 1% to 5% ammonium phosphate was desensitized to explosion and was rendered non-explosive when containing more than 5% ammonium phosphate. U.S. Pat. No. 6,130,139 discloses the use of ammonium phosphate compounds including ammonium polyphosphate as a barrier coating applied to ammonium nitrate prills that reduces the efficacy of the prills as oxidizing agents.

The present invention combines various ammonium phosphate compounds that are known to suppress flame formation and explosivity and act as fire retardants with the preferred and strongly oxidizing compounds described in Table 1 such that these compounds are rendered non-explosive and resistant to combustion. Unlike the methods disclosed in the prior art, the ammonium phosphate compounds used in this invention do not have to be incorporated with ammonium nitrate or other oxidizing agents during the manufacture of fertilizer or used to coat prills in order to be effective. The selected compounds can simply be blended together to form an intimate mixture when used to prepare a cooling composition. Compositions used in this invention that contain ammonium phosphate compounds along with strongly oxidizing endothermic compounds remain safe and non-explosive even though blended with carbon containing compounds that are known to form explosive mixtures with compounds such as ammonium nitrate. This safety feature is useful for compositions that are used in cold packs, since such cold pack products often contain carbon-based gels and thickening agents such as guar gum, xanthates and carboxymethylcellulose.

When prepared in this manner, the ammonium phosphate compounds, and especially ammonium polyphosphate, also improve the stability and lengthen the shelf-life of mixtures of urea and ammonium nitrate. Mixtures of urea and ammonium nitrate are destabilized by acidic hydrolysis of the urea to form free water which can prematurely solubilize ammonium nitrate during storage. Ammonium polyphosphate is hydroscopic and is thought to act as a scavenger of any free water that might form during the storage of ammonium nitrate/urea mixtures, thus preventing the water from dissolving ammonium nitrate. Urea is also destabilized by other endothermic compounds besides ammonium nitrate when mixed together, and ammonium polyphosphate can also be an effective stabilizer of such mixtures.

With the current social and political trends favoring sustainability and protection of the environment, chemical products that are non-toxic and can be reused or recycled or disposed of without contributing to pollution and waste are greatly preferred over non-recyclable products. The primary emphasis in the prior art is the disclosure of endothermic compounds that are effective cooling agents with little regard for toxicity of the compounds or their reuse or disposal. The use of a spent cooling agent as fertilizer or plant growth regulator is sometimes mentioned but only as a secondary benefit, primarily with respect to cooling agents that utilize urea, ammonium nitrate, potassium nitrate, ammonium sulfate with attention paid to nitrogen-containing compounds that can be used as nitrogen-containing fertilizers.

In this present invention, effective endothermic compositions are described that can be reused as a balanced fertilizer containing nitrogen (N), phosphorus (P), and potassium (K) because only balanced fertilizers contain all of the essential primarily nutrients necessary for plant growth. Such compositions have greater residual value compared to solutions that contain only nitrogen or only nitrogen and potassium and are more useful to the end-user and more likely to be reused and recycled instead of being disposed of as a waste material when no longer effective as a coolant.

Compositions in accordance with this invention thus comprise cooling agents that always include one or more compounds from a group consisting of endothermic compounds shown in Table 1 that contain potassium; one or more compounds from a group of endothermic compounds shown in Table 1 that contain nitrogen; and at least one compound from a group consisting of ammonium phosphate, diammonium phosphate, ammonium polyphosphate, ammonium pyrophosphate and ammonium metaphosphate such that the compound or mixture of compounds in this group is at least 1% by weight of the final composition. The compositions may also include one or more compounds from a group comprising sodium perchlorite ($NaClO3$), sodium perchlorate ($NaClO4$), sodium bromate dehydrate ($NaBr.2H_2O$), sodium acetate trihydrate ($NaC_2H_3O_2.3H_2O$), sodium thiosulfate ($Na_2S_2O_3$), sodium thiosulfate pentahydrate ($Na_2S_2O_3.5H_2O$), trisodium phosphate ($Na_3PO_4$), and sodium bicarbonate ($NaHCO_3$,) and about 0.5 to 1% thickening agent comprising guar gum, xanthate gum, carboxymethylcellulose, or mixtures thereof. The compositions when mixed with water at around 20° C. attain a temperature of around 10° C. or less within 60 seconds after mixing and can be recycled for use as a balanced NPK fertilizer when no longer useful as a coolant.

DESCRIPTION OF THE PREFERRED EMBODIMENTS OF THE INVENTION

A preferred composition within the broad ranges set forth above, which exhibits an optimum combination of properties, consists essentially of compounds or blends of compounds: (1) such that the mixture contains nitrogen, phosphorus and potassium (NPK); (2) such that the mixture shows at least a 14° C. drop in temperature when mixed with water; and (3) that are non-toxic or have an $LD_{50}$ greater than 1000. The preferred composition is thus selected from a group consisting of urea, potassium nitrate, potassium thiosulfate pentahydrate, sodium nitrate, ammonium nitrate, ammonium phosphate and ammonium polyphosphate. In parts by weight, the preferred composition contains about 50 to 95 parts ammonium nitrate; about 0 to 50 parts urea; about 0 to 50 parts sodium nitrate; about 4 to 30 parts potassium nitrate or potassium thiosulfate pentahydrate; and between 1 and 10 parts ammonium phosphate or ammonium polyphosphate. Preferably about 90 parts by weight water are added to this composition to initiate the endothermic reaction.

Although the particle size of the various components of the composition can vary depending upon the application, the components must be blended together to create an intimate mixture whereby the particles of ammonium phosphate or polyphosphate are in very close contact or proximity to the particles of urea, potassium nitrate, sodium nitrate and ammonium nitrate. To that end, the components of the composition are typically co-milled together to create an intimate mix having an average particle size of at least 100 mesh and preferably greater than 200 mesh.

For example, a cooling agent composition that is useful for cold packs contains 50 parts ammonium nitrate, 40 parts urea, 4 parts potassium nitrate, 5 parts ammonium polyphosphate and around 1 part guar gum or xanthate powder added as a thickening agent. The mixture of components is co-milled to form a 100 mesh powder that when mixed with around 90 parts water is effective to reduce the temperature of the mixture by around 20° C. within 120 seconds after dissolution of the components and can maintain cooling of a surface for at least 15 minutes. The dry-milled cooling agent composition is stable, non-toxic, non-explosive and safe to use as a consumer product. The saturated solution containing the cooling agent composition forms a balanced NPK liquid fertilizer having an NPK ratio of 42-1.4-1.6.

As another example, a cooling agent composition that is useful for chilling canned or bottled beverages contains 90 parts ammonium nitrate, 5 parts potassium nitrate and 5 parts ammonium phosphate. The mixture of components is co-milled to form a 200 plus mesh powder that when mixed with around 90 parts water is effective to reduce the temperature of the mixture by around 30° C. within 60 seconds after dissolution of the components and can be used to rapidly cool a beverage where rapidity of cooling is more important than maintaining a cooling effect. The dry-milled cooling agent composition is non-toxic, non-explosive and safe to use as a consumer product. The saturated solution containing the cooling agent composition forms a balanced NPK liquid fertilizer having an NPK ratio of 32-1.4-2.

It is thus apparent that the compositions of the present invention accomplish the principal objectives set forth above. Various modifications may be made without departing from the spirit and scope of the invention.

We claim:

1. In a container that holds a salt material and water which when mixed together provide an endothermic reaction caused by dissolution of the salt material which is useful for cooling purposes, the improvement comprising:
the salt material as a non-explosive and recyclable composition including in combination ammonium metaphosphate, potassium thio sulfate, and ammonium thiocyanate pentahydrate such that the soluble salt or combination of soluble salts from this group is at least 1% by weight of the final composition.

2. A container according to claim 1 wherein the salt material in the container is provided with water in a ratio of 0.6 to 2.6 parts soluble salts and 0.9 to 3.0 parts water that when mixed together produce an endothermic process capable of cooling surfaces, liquids and solids upon contact.

3. A container according to claim 1 that contains 0.5 to 1% thickening agent comprising guar gum, xanthate gum, carboxymethylcellulose, or mixtures thereof.

4. A container according to claim 1 configured as a cold pack.

5. A container according to claim 1 configured as a beverage cooler.

* * * * *